US012706985B2

(12) United States Patent
Li et al.

(10) Patent No.: US 12,706,985 B2
(45) Date of Patent: Aug. 11, 2026

(54) DISTRIBUTING PACING RESULTS FOR LOW LATENCY CONTENT SERVING

(71) Applicant: Microsoft Technology Licensing, LLC, Redmond, WA (US)

(72) Inventors: Bailan Li, San Carlos, CA (US); Samira Tasharofi, Atherton, CA (US); Yi Zhang, Sunnyvale, CA (US); Tao Cai, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 18/986,477

(22) Filed: Dec. 18, 2024

(65) Prior Publication Data

US 2026/0172485 A1 Jun. 18, 2026

(51) Int. Cl.
*H04L 67/61* (2022.01)
*H04L 67/141* (2022.01)

(52) U.S. Cl.
CPC ............ *H04L 67/61* (2022.05); *H04L 67/141* (2013.01)

(58) Field of Classification Search
CPC .............................. H04L 67/61; H04L 67/141
USPC ........................................................ 709/217
See application file for complete search history.

(56) References Cited

U.S. PATENT DOCUMENTS

| | | | | |
|---|---|---|---|---|
| 7,660,894 | B1 * | 2/2010 | Carrie | H04L 67/60 709/225 |
| 2017/0093616 | A1 * | 3/2017 | Yan | H04L 47/125 |
| 2017/0324795 | A1 * | 11/2017 | Ashida | H04L 47/10 |
| 2018/0053220 | A1 * | 2/2018 | Bhalgat | G06Q 30/0276 |
| 2022/0053368 | A1 * | 2/2022 | Li | H04L 47/2425 |
| 2023/0104492 | A1 * | 4/2023 | Mataev | G06F 3/0611 711/154 |
| 2024/0137427 | A1 * | 4/2024 | Cai | H04L 67/63 |

OTHER PUBLICATIONS

Xie, et al., "How we built Twitter's highly reliable ads pacing service", Retrieved from Internet URL: https://blog.x.com/engineering/en_us/topics/infrastructure/2021/how-we-built-twitter-s-highly-reliable-ads-pacing-service, Dec. 16, 2021, 10 pages.

* cited by examiner

*Primary Examiner* — Hannah S Wang
(74) *Attorney, Agent, or Firm* — Nicholson De Vos Webster & Elliott LLP

(57) ABSTRACT

Methods, systems, and apparatuses include establishing, by a distributor of a content serving system, a streaming connection with a pacing host of the content serving system. The pacing results are received by the distributor from the pacing host through the streaming connection. The pacing results are stored by the distributor in a local cache memory. The pacing results are streamed by the distributor from the local cache memory to serving hosts.

18 Claims, 6 Drawing Sheets

200
Aggregated Serving Results
210
CONTENT PACING LAYER
205
Pacing
Results
202
CONTENT PACING DISTRIBUTION LAYER
150
Distributed
Pacing
Results
204
SERVING RESULTS AGGREGATOR
160
Serving
Results
208
CONTENT SERVING LAYER
215
Served
Content
206
USER SYSTEM
110

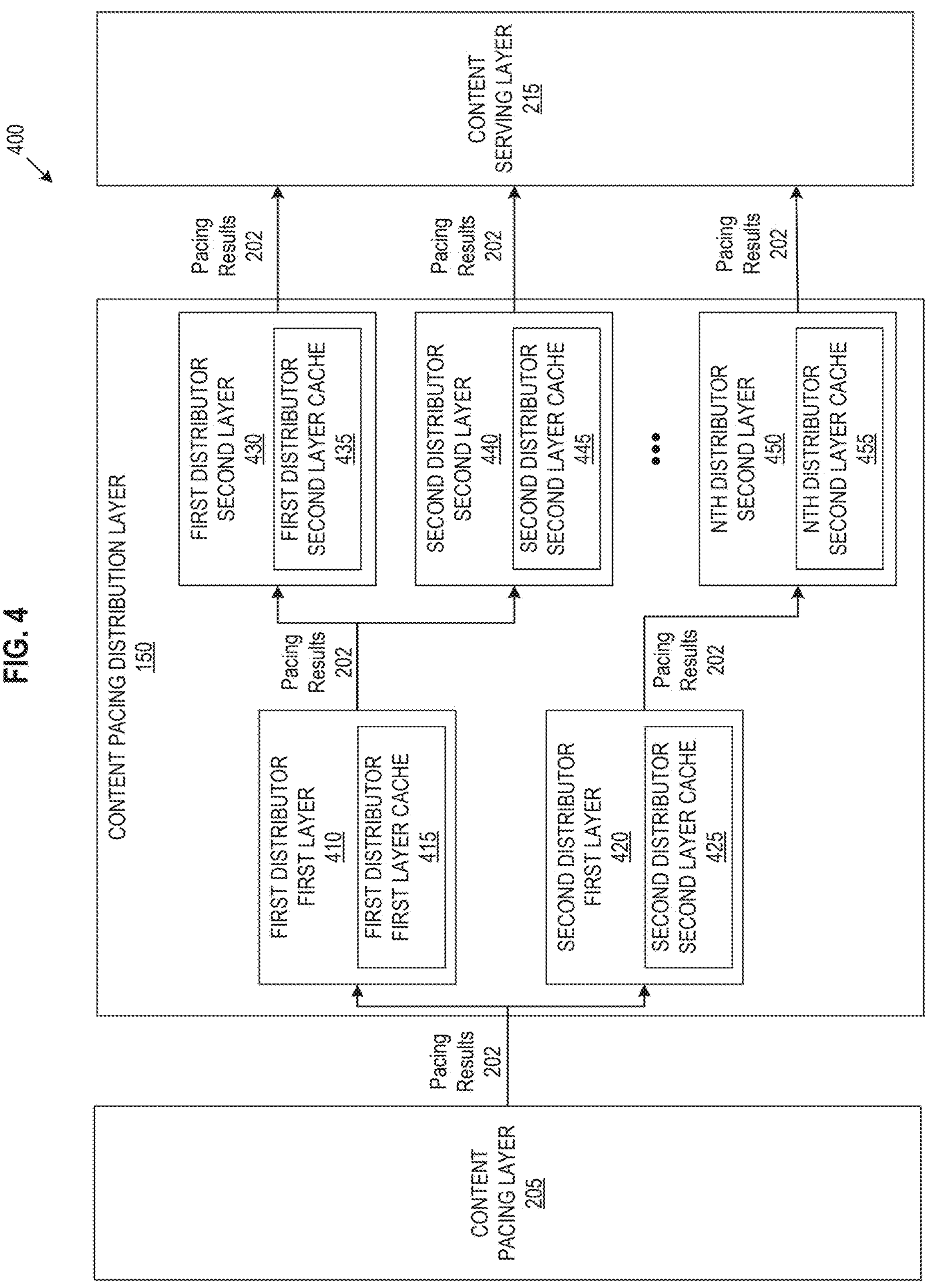
FIG. 4
400
CONTENT PACING LAYER 205
Pacing Results 202
CONTENT PACING DISTRIBUTION LAYER 150
FIRST DISTRIBUTOR FIRST LAYER 410
FIRST DISTRIBUTOR FIRST LAYER CACHE 415
SECOND DISTRIBUTOR FIRST LAYER 420
SECOND DISTRIBUTOR SECOND LAYER CACHE 425
Pacing Results 202
Pacing Results 202
FIRST DISTRIBUTOR SECOND LAYER 430
FIRST DISTRIBUTOR SECOND LAYER CACHE 435
SECOND DISTRIBUTOR SECOND LAYER 440
SECOND DISTRIBUTOR SECOND LAYER CACHE 445
NTH DISTRIBUTOR SECOND LAYER 450
NTH DISTRIBUTOR SECOND LAYER CACHE 455
Pacing Results 202
Pacing Results 202
Pacing Results 202
CONTENT SERVING LAYER 215

ESTABLISH, BY A DISTRIBUTOR, A STREAMING CONNECTION WITH A PACING HOST TO RECEIVE PACING RESULTS FROM THE PACING HOST
505

RECEIVE, BY THE DISTRIBUTOR, THE PACING RESULTS FROM THE PACING HOST
510

STORE, BY THE DISTRIBUTOR, THE PACING RESULTS IN A LOCAL CACHE MEMORY
515

STREAM, BY THE DISTRIBUTOR, THE PACING RESULTS FROM THE LOCAL CACHE MEMORY TO SERVING HOSTS
520

DISTRIBUTING PACING RESULTS FOR LOW LATENCY CONTENT SERVING

TECHNICAL FIELD

The present disclosure generally relates to content serving, and more specifically, relates to serving content using pacing results.

BACKGROUND ART

Software applications use computer networks to distribute digital content to user computing devices. On user devices, digital content can be displayed through slots of a graphical user interface. For example, news feeds and home pages contain slots. When a user logs in to or opens a software application, or traverses to a new page of an application, the application may generate one or more requests for content to be displayed in one or more of the available slots.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates another example computing system that includes a content pacing distribution layer in accordance with some embodiments of the present disclosure.

DETAILED DESCRIPTION

Figure 1:
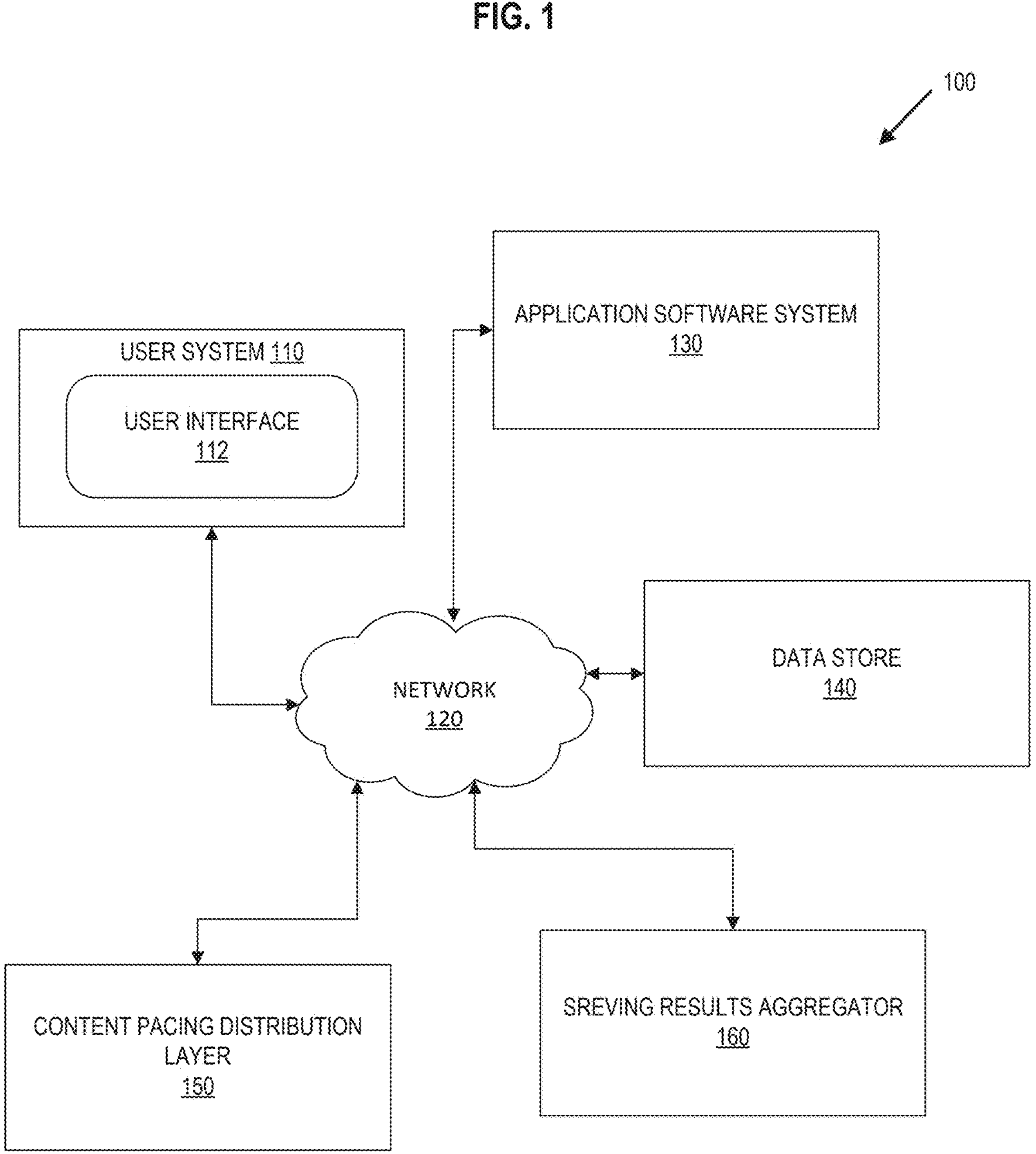
FIG. 1 illustrates an example computing system that includes a content pacing distribution layer in accordance with some embodiments of the present disclosure.

A content serving system distributes digital content to user devices through, for example, web sites, mobile apps, and VR/AR/MR (virtual reality, augmented reality, mixed reality) systems. A content serving system distributes content to different users through an online network based on, for example, rules, targeting criteria, and/or machine learning model output. Examples of content distributions (e.g., serving content) include distributions of job postings, user-generated content, connection recommendations, news updates, e-commerce, entertainment, education and training materials, and advertisements. Served content is content sent by the content serving system to a client device of the online serving system, such as a user device. The served content can be displayed on the client device or otherwise used by the client device.

A content serving system often includes or interacts with an automated content-to-request matching process, such as a real-time bidding (RTB) process. Automated content-to-request matching processes programmatically match digital content distributions to requests in real time. A request is, for example, a network message, such as an HTTP (HyperText Transfer Protocol) request for content, which is generated in connection with an online user interface event such as a click or a page load. The term click is used to refer to any type of action taken by a user with an input device or sensor, which causes a signal to be received and processed by the user's device, including mouse clicks, taps on touchscreen display elements, voice commands, gestures, haptic inputs, and/or other forms of user input. The content serving system can log impressions, clicks, post-click and post-impression events, which the content serving system can use to compute performance metrics.

These content serving systems often rely on content creators to create the content to be served through the system. These content creators can, for example, create digital content with certain requirements for how that content should be served through the content serving system. These requirements can include pacing requirements for a pace at which the content should be served. For example, the pace of content serving describes the rate at which content is served to user devices of the content serving system. For example, the pace is a number of users who are served the relevant content in a given time period. The content serving systems use these pacing requirements as part of determining what content to serve to which users. The content serving systems, however, must evaluate these requirements based on the amount of times the content has already been served (e.g., serving results) in order to properly compare the actual pace at which the content is being served to the pace set forth in the pacing requirements. These content serving systems include pacing instances (also referred to as pacing hosts) that determine the pacing results based on the pacing requirements and the serving results. Pacing instance refers to the pacing host that determines a pacing signal for the content serving system. As the size of these content serving systems grows, the number of serving hosts connected to the pacing host increases, resulting in increased workload for the pacing host, associated latency problems, and other challenges to scalability. Conventional content serving systems can address these latency problems by increasing the number of pacing instances which determine pacing results in parallel.

By determining pacing results using multiple pacing instances, however, the pacing signal across the pacing instances can vary resulting in an inaccurate or inconsistent pacing signal as a whole and therefore nonoptimal content serving results. The pacing results are the information generated by the pacing host (e.g., pacing instances) and used by the content serving system to determine whether to serve content. The pacing signal is a representation of these pacing results over time. Accordingly, an instance of the pacing signal is the pacing results at that time. Multiple pacing instances can produce multiple differing pacing signals for a single piece of digital content (e.g., due to timing, latency, input data, pacing algorithm, etc.). This deficiency is particularly acute for larger content serving systems as expanding content serving systems require ever increasing number of pacing instances to cope with the load of content serving which results in larger and larger pacing signal inconsistencies.

Aspects of the present disclosure are directed to improving latency, scaling of pacing system distribution, pacing signal inconsistency, and other performance metrics for content serving systems. For example, aspects of the present disclosure are directed to distributing pacing results for low latency content serving. By implementing a pacing distribution layer to fan-out the pacing results to the different content serving hosts, the content serving system can use a single pacing signal producer even in systems with large numbers of serving hosts which results in a consistent pacing signal. Additionally, by using data streaming methods to stream pacing signals between layers of the content serving system, the latency of the content serving system is significantly reduced. Furthermore, aspects of the present disclosure can use a multi-tier distribution layer to keep latencies small as the size of the content serving system is scaled up without needing to increase the number of pacing instances. This allows these systems to separate the scaling of the content serving system from the pacing instances preventing pacing signal inconsistencies.

FIG. 1 illustrates an example computing system 100 that includes a content pacing distribution layer 150 in accordance with some embodiments of the present disclosure. In the embodiment of FIG. 1, computing system 100 includes a user system 110, a network 120, an application software system 130, a data store 140, a content pacing distribution layer 150, and a serving results aggregator 160. Each of these components of computing system 100 are described in more detail below. In some embodiments, the components of computing system 100 and their respective subcomponents are implemented on one or more of user devices, cloud servers and/or databases, and combinations thereof.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 is any type of user interface as described above. User interface 112 can be used to interact with a chat interface and view or otherwise perceive output that includes data produced by application software system 130. For example, user interface 112 can include a graphical user interface and/or a conversational voice/speech interface that includes a mechanism for entering queries to an application interface and viewing query results and/or other digital content such as digital advertisement. Examples of user interface 112 include web browsers, command line interfaces, and mobile apps. User interface 112 as used herein can include application programming interfaces (APIs).

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that includes or utilizes functionality and/or outputs provided by content pacing distribution layer 150 and/or serving results aggregator 160. Examples of application software system 130 include but are not limited to online services including connections network software, such as social media platforms, and systems that are based on connections network software, such as general-purpose search engines, content distribution systems including media feeds, bulletin boards, and messaging systems, special purpose software such as but not limited to job search software, recruiter search software, sales assistance software, advertising software, learning and education software, enterprise systems, customer relationship management (CRM) systems, or any combination of any of the foregoing.

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

While not specifically shown, it should be understood that any of user system 110, application software system 130, data store 140, content pacing distribution layer 150, and serving results aggregator 160 includes an interface embodied as computer programming code stored in computer memory that when executed causes a computing device to enable bidirectional communication with any other of user system 110, application software system 130, data store 140, content pacing distribution layer 150, and serving results aggregator 160 using a communicative coupling mechanism. Examples of communicative coupling mechanisms include network interfaces, inter-process communication (IPC) interfaces and application program interfaces (APIs).

Data store 140 can include any combination of different types of memory devices.

Data store 140 stores digital data used by user system 110, application software system 130, content pacing distribution layer 150, and/or serving results aggregator 160. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Each of user system 110, application software system 130, data store 140, content pacing distribution layer 150, and serving results aggregator 160 is implemented using at least one computing device that is communicatively coupled to electronic communications network 120. Any of user system 110, application software system 130, data store 140, content pacing distribution layer 150, and serving results aggregator 160 can be bidirectionally communicatively coupled by network 120. User system 110 as well as one or more different user systems (not shown) can be bidirectionally communicatively coupled to application software system 130.

A typical user of user system 110 can be an administrator or end user of application software system 130, content pacing distribution layer 150, and/or serving results aggregator 160. User system 110 is configured to communicate bidirectionally with any of application software system 130, data store 140, content pacing distribution layer 150, and/or serving results aggregator 160 over network 120.

The features and functionality of user system 110, application software system 130, data store 140, content pacing distribution layer 150, and serving results aggregator 160 are implemented using computer software, hardware, or software and hardware, and can include combinations of automated functionality, data structures, and digital data, which are represented schematically in the figures. User system 110, application software system 130, data store 140, content pacing distribution layer 150, and serving results aggregator 160 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

The content pacing distribution layer 150 receives pacing results and distributes the pacing results to the content serving layer through multiple distributors in the content pacing distribution layer. For example, content pacing distribution layer 150 receives pacing results through a data stream from the content pacing layer and distributes the pacing results to serving hosts of the content serving layer to use when determining content to serve to users. Further details regarding the operations of content pacing distribution layer 150 are described below.

The serving results aggregator 160 aggregates the serving results from the content serving layer to use when generating the pacing results. Further details regarding the operations of serving results aggregator 160 are described below.

Figure 2:
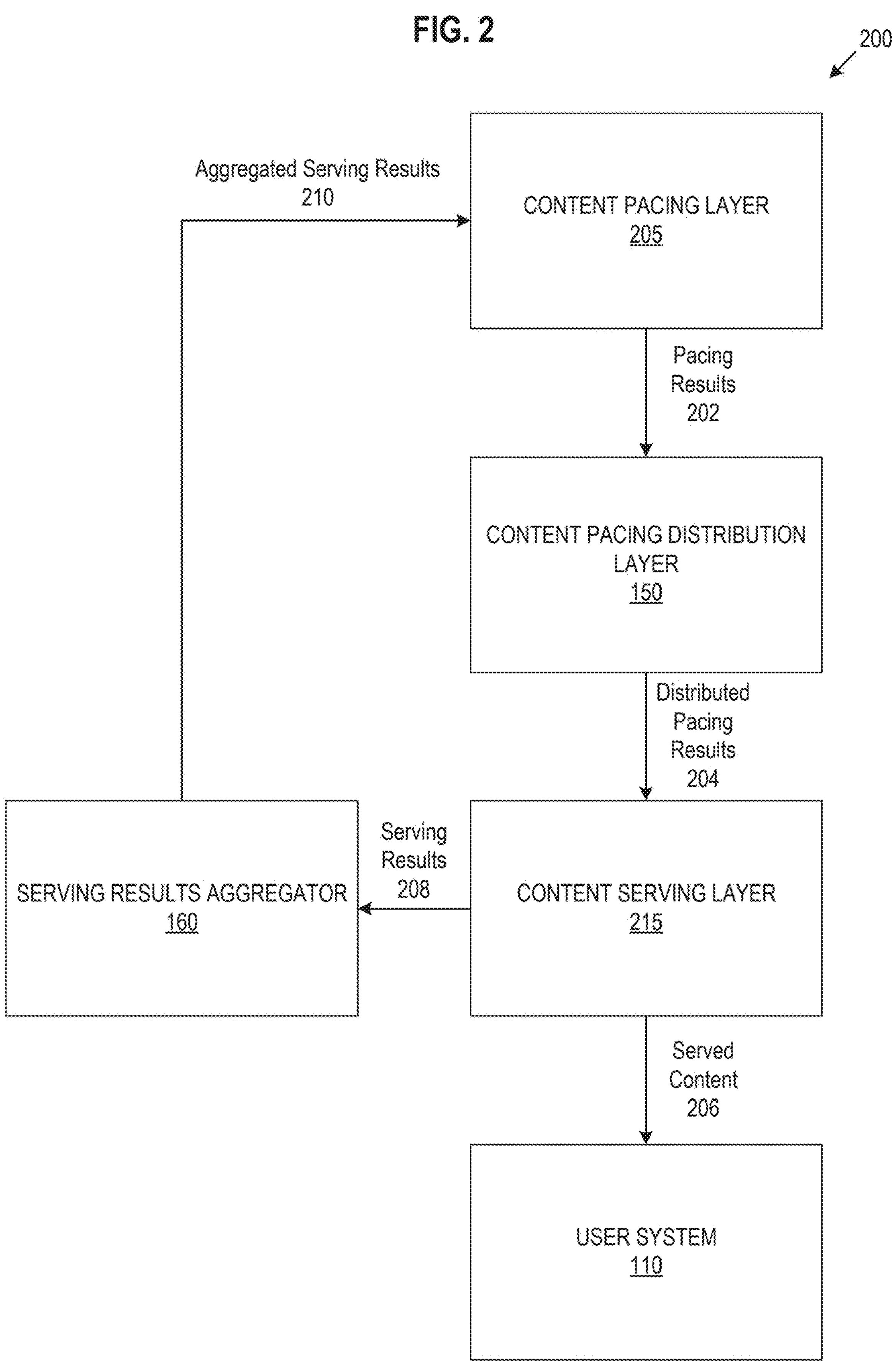
FIG. 2 illustrates another example computing system that includes a content pacing distribution layer in accordance with some embodiments of the present disclosure.

FIG. 2 illustrates another example computing system 200 that includes a content pacing distribution layer in accordance with some embodiments of the present disclosure. As shown in FIG. 2, computing system 200 also includes content pacing layer 205, content serving layer 215, serving results aggregator 160, and user system 110. In some embodiments, content pacing layer 205, content pacing distribution layer 150, content serving layer 215, serving results aggregator 160, and/or user system 110 are coupled to a data storage device (e.g., data store 140 of FIG. 1) for storing and retrieving data. In some embodiments, computing system 200 operates in real-time or near real-time to stream serving results and pacing results between the components of computing system 200 with low latency. Real-time or near real-time as used within this application refers to the processing of data and signals with relatively short periods of time delay such that a user of a system (e.g., user system 110) when interacting with a computing system (e.g., computing systems 100, 200, 300, and/or 400) does not notice or would not notice an appreciable delay between interacting with the computing system and the computing system updating based on that interaction. In one example, real-time or near real-time refers to a timescale of seconds or less between receiving a signal (e.g., pacing results 202) and the resulting computation based on the signal (e.g., providing served content 206 based on pacing results 202).

As shown in FIG. 2, computing system 200 includes a content pacing layer 205 for determining pacing results 202 from aggregated serving results 210. Pacing results, as discussed herein, refers to data used by pacing services to control rates of content distribution for content of an online system. For example, computing system 200 is an online social network platform that includes multiple content creators that create content to deliver to users of the online social network platform. These content creators can set pacing requirements for how to deliver the content, whom to deliver the content to, when to deliver the content, for how long to deliver the content, how much content to deliver, etc.

In some embodiments, these pacing requirements include: a timeframe for serving content, a budget for serving content, how much of the budget has been used, etc. These pacing requirements can be applied to a content campaign to determine whether to serve content to a user of computing system 200 and/or what content to serve to a user of computing system 200. For example, a content creator can create different pieces of content with pacing requirements for each of the pieces. The pieces of content with associated pacing requirements are referred to as a campaign or a content campaign. In some embodiments, the content campaign is an advertisement campaign.

Computing system 200 determines served content 206 and which user (e.g., user of user system 110) to serve the content to using the pacing requirements for the content campaigns. Due to the real-time nature of a system such as an online social network platform, however, these pacing requirements must be continually reevaluated based on information about the most recent content served to users (e.g., serving results 208 and/or aggregated serving results 210). Accordingly, content pacing layer 205 generates pacing results 202 based on the pacing requirements, serving results 208 and/or aggregated serving results 210. Content pacing layer 205 sends the generated pacing results 202 to content pacing distribution layer 150 for use in determining content to serve (e.g., served content 206).

The disclosed technologies are described in the context of online network-based digital content distribution systems (e.g., content serving system). A content distribution system as used herein may contain one or more digital content items and one or more distribution parameters. Examples of distribution parameters include targeting criteria, pacing requirements, and serving criteria. An example of a targeting criterion is an attribute value, such as a job title. An example of a pacing requirement is a pacing threshold, a data value that determines whether a particular request will be served, i.e., matched with a content distribution, by the content-to-request matching process. For instance, a lower pacing threshold could result in fewer requests being served in a given time period, thereby slowing the pace of content delivery for a content campaign, and a higher pacing threshold may increase the number of requests served, thereby speeding up the pace of content delivery. An example of a serving criterion is a data value that quantifies a content distributor's priority level for the content campaign relative to other content campaigns. For instance, a higher value of the serving criterion may increase the priority of the content campaign relative to other available content campaigns, and a lower value of the serving criterion may decrease the priority of the content campaign relative to the other available content campaigns. From the standpoint of the content serving system, a value of the serving criterion quantifies the value of the request relative to other requests.

In some embodiments, pacing results 202 include information about the content campaigns such as the running bid of a content campaign, an adjustment for a bid of the campaign, a throttling factor for the campaign, and other similar metrics. The pacing results 202 can therefore represent the current state of the pacing in view of pacing requirements (e.g., pacing threshold). For example, the throttling factor can be applied to the pacing threshold to result in fewer requests being served in a given time period than would otherwise result without the throttling factor. Other examples of pacing results 202, such as the bid of a content campaign and an adjustment for a bid of the campaign can be used to alter the serving criterion (e.g., increasing or decreasing the priority level for the content campaign). The bid can be an amount of money that the content campaign offers to pay to present the content to the user device. Accordingly, the bid can correspond with how much the content campaign will pay to have the content displayed.

In some embodiments, content pacing layer 205 continually updates pacing results 202 (e.g., generates new pacing results 202) based on the pacing requirements for a content campaign and the most recent serving results (e.g., serving results 208 and/or aggregated serving results 210) for the content associated with that content campaign. By using a single pacing service instance to calculate pacing results 202, computing system 200 ensures that the pacing results signal is internally consistent and accurate. For example, by avoiding multiple instances of computing pacing results, computing system 200 ensures that the whole of the pacing results signal is consistent with both the pacing requirements and the most recent serving results.

In some embodiments, content pacing layer 205 sends pacing results 202 to content pacing distribution layer 150 using a data streaming protocol. In some embodiments, a host of content pacing layer 205 establishes a streaming connection with a distributor of content pacing distribution layer 150. For example, a host establishes a connection with a distributor and continually updates the in-memory cache of the distributor with the most recently generated pacing results 202. In such an example, computing system 200 maintains a low latency for pacing results 202 because they are stored locally to the distributor. Further details regarding sending pacing results 202 to content pacing distribution layer 150 are discussed with reference to FIGS. 3 and 4.

Content pacing distribution layer 150 receives pacing results 202 and generates distributed pacing results 204 to send to content serving layer 215. As discussed in further detail with reference to FIGS. 3 and 4, content pacing distribution layer 150 includes multiple distributors (e.g., first distributor 330, second distributor 340, and nth distributor 350 of FIG. 3) with each distributor connecting to serving hosts in the content serving layer 215 that serve content to user system 110. By using multiple distributors in content pacing distribution layer 150 to execute the fan-out for the pacing results 202, computing system 200 can maintain a consistent pacing results signal while keeping latency low and allowing scalability. For example, content pacing distribution layer 150 can allocate an additional distributor to content serving layer 215 in response to a number of serving hosts satisfying a threshold. The threshold can be based on, for example, the number of distributors in content pacing distribution layer 150 and a number of allowable serving hosts per distributor. In some embodiments, content pacing distribution layer 150 assigns a new distributor based on the latency of computing system 200. For example, content pacing distribution layer 150 assigns a new distributor in response to the latency following below a threshold.

In some embodiments, distributed pacing results 204 is the same pacing results 202 computed by content pacing layer 205 but distributed such that each distributor of content pacing distribution layer 150 is responsible for sending a subset of pacing results 202 to content serving layer 215. Accordingly, as mentioned above, content pacing distribution layer 150 can assign new distributors of content pacing distribution layer 150 as the number of serving hosts of content serving layer 215 increases. Content pacing distribution layer 150 can then assign the new distributors with a new subset of distributed pacing results 204. Further details regarding distributed pacing results 204 are discussed with reference to FIGS. 3 and 4.

In some embodiments, content pacing distribution layer 150 sends distributed pacing results 204 to content serving layer 215 using a data streaming protocol. For example, a distributor of content pacing distribution layer 150 establishes a streaming connection with content serving layer 215. In some embodiments, a distributor announces its available data (e.g., its subset of distributed pacing results 204) and a serving host of content serving layer 215 discovers the available distributor and establishes a streaming connection. In such an embodiment, the serving host receives a stream of the subset of distributed pacing results 204 from the distributor. Further details regarding sending distributed pacing results 204 to content serving layer 215 are discussed with reference to FIGS. 3 and 4.

Content serving layer 215 receives distributed pacing results 204 from content pacing distribution layer 150 and determines content to serve to users of the computing system. For example, a serving host of content serving layer 215 receives a stream of a subset of distributed pacing results 204 from a distributor of content pacing distribution layer 150 and determines served content 206 to serve to user system 110 using the subset of distributed pacing results 204. In some embodiments, content serving layer 215 determines served content 206 to serve to user system 110 using distribution parameters such as targeting criteria and serving criteria as explained above. Content serving layer 215 sends served content 206 to user system 110 causing user system to present served content 206 to a user of user system 110.

In some embodiments, content serving layer 215 generates serving results 208 using served content 206. For example, a serving host of content serving layer 215 generates serving results 208 indicating what content the serving host sent to user system 110 (e.g., served content 206). In some embodiments, content serving layer 215 generates serving results 208 including information about content that was considered but not served. Content serving layer 215 sends serving results 208 to serving results aggregator 160. Serving results aggregator 160 receives serving results 208 for serving hosts of content serving layer 215 and generates aggregated serving results 210 by aggregating the serving results 208. These aggregated serving results 210 are used by content pacing layer 205 as an input for determining updated pacing results and as feedback for the previous pacing results (e.g., pacing results 202). Serving results aggregator 160 sends aggregated serving results 210 to content pacing layer 205 for generating updated pacing results.

Figure 3:
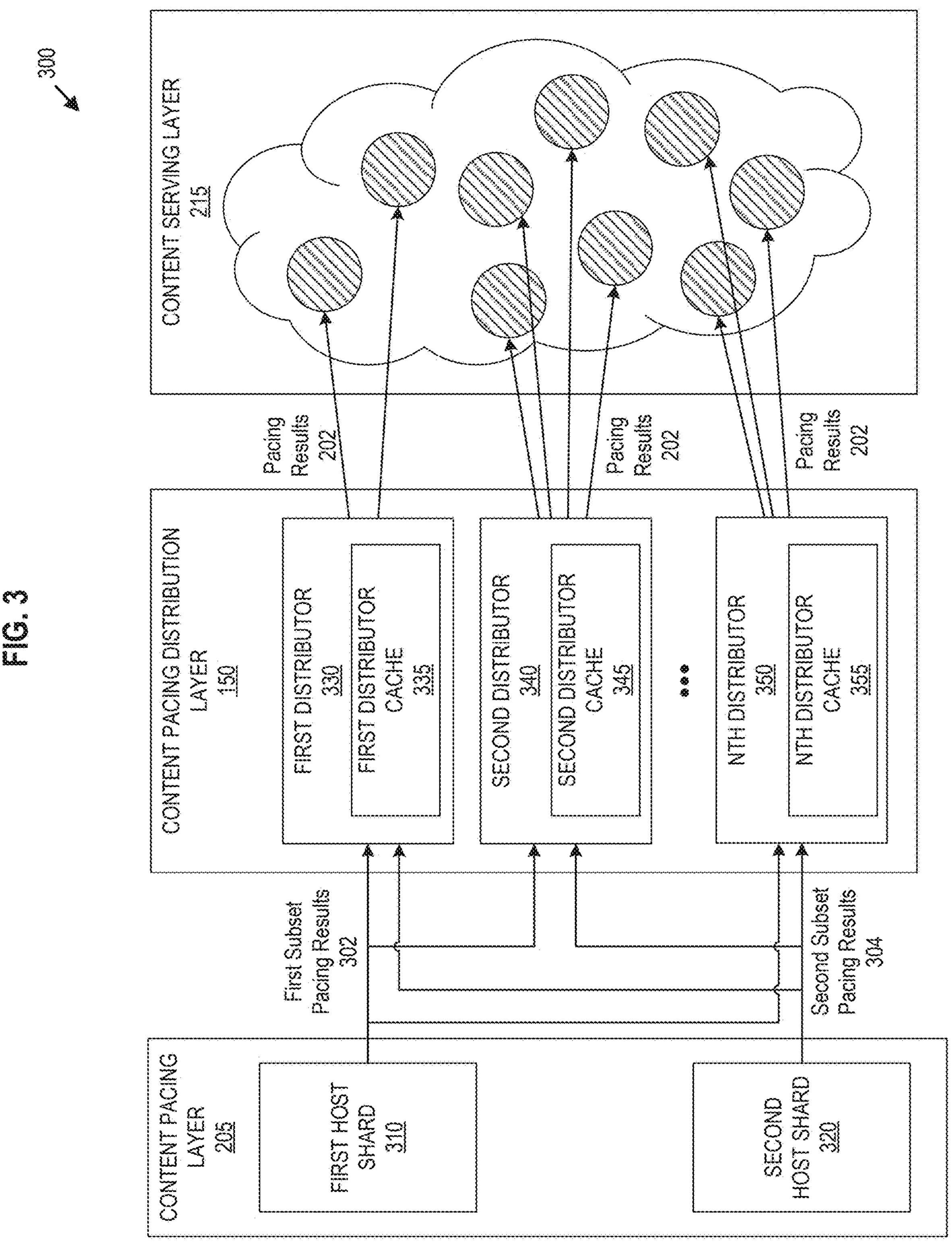
FIG. 3 illustrates another example computing system that includes a content pacing distribution layer in accordance with some embodiments of the present disclosure.

FIG. 3 illustrates another example computing system 300 that includes a content pacing distribution layer 150 in accordance with some embodiments of the present disclosure. As shown in FIG. 3, computing system 300 also includes content pacing layer 205 and content serving layer 215. Content pacing layer 205 includes multiple host shards to distribute computation of pacing signals (e.g., pacing results 202) for serving of digital content (e.g., advertisements), such as first host shard 310 and second host shard 320 as illustrated in FIG. 3.

Although only two host shards are illustrated, content pacing layer 205 can include any number of host shards. Content pacing distribution layer 150 includes multiple distributors, such as first distributor 330, second distributor 340, and nth distributor 350. Although three distributors are illustrated, content pacing distribution layer 150 can include any number of distributors. Additionally, as explained in further detail with reference to FIG. 4, content pacing distribution layer 150 can include multiple layers of distributors.

As shown in FIG. 3, first host shard 310 and second host shard 320 couple to each of the distributors (e.g., first distributor 330, second distributor 340, and nth distributor 350). For example, first host shard 310 generates first subset of pacing results 302 which are pacing results for a first subset of content campaigns. Similarly, second host shard 320 generates second subset of pacing results 304 which are pacing results for a second subset of content campaigns. The pacing results for the whole computing system 300 (e.g., pacing results 202) are the combination of first subset of pacing results 302 and second subset of pacing results 304.

Although only two subsets are illustrated and described, computing system 300 can include any number of pacing results subsets based on the needs of computing system 300. As shown in FIG. 3, each of first distributor 330, second distributor 340, and nth distributor 350 are coupled to both host shards (e.g., first host shard 310 and second host shard 320). Accordingly, each of first distributor 330, second distributor 340, and nth distributor 350 receives both first subset of pacing results 302 and second subset of pacing results 304.

In some embodiments, each of first distributor 330, second distributor 340, and nth distributor 350 aggregate first subset of pacing results 302 and second subset of pacing results 304 into aggregated pacing results (e.g., pacing results 202). In such embodiments, because first subset of pacing results 302 and second subset of pacing results 304 are generated for different subsets of content campaigns, there are no signal discrepancies in the aggregated pacing results.

In some embodiments, as explained with reference to FIG. 2, content pacing layer 205 streams pacing results 202 to content pacing distribution layer 150. For example, first host shard 310 announces, through a streaming protocol (such as remote procedure protocol (RPC)), that it has available data (e.g., first subset of pacing results 302). In such an example, each of first distributor 330, second distributor 340, and nth distributor 350 can discover first host shard 310 through the streaming protocol as an available dispatcher for the data (e.g., first subset of pacing results 302). Accordingly, first distributor 330, second distributor 340, and nth distributor 350 establish a streaming connection with first host shard 310 such that first host shard 310 streams first subset of pacing results 302 as they are generated based on the serving results (e.g., serving results 208 and/or aggregated serving results 210) and any changes in pacing requirements.

In some embodiments, content pacing layer 205 streams pacing results 202 to content pacing distribution layer 150 by establishing itself as a host (e.g., RPC or restful service host) of pacing results 202 and streams pacing results 202 to content pacing distribution layer 150 in response to receiving a poll from content pacing distribution layer 150 for pacing results 202. For example, each of first distributor 330, second distributor 340, and nth distributor 350 receive the stream of pacing results 202 in response to polling the host associated with content pacing layer 205 (e.g., one or both of first host shard 310 and second host shard 320). In other embodiments, content pacing layer 205 streams pacing results 202 to content pacing distribution layer 150 by actively pushing any new pacing results 202 to content pacing distribution layer 150. For example, content pacing layer 205 (e.g., one or both of first host shard 310 and second host shard 320) pushes pacing results 202 to each of first distributor 330, second distributor 340, and nth distributor 350 in response to generating pacing results 202 (e.g., from aggregated serving results 210).

In some embodiments, each of first distributor 330, second distributor 340, and nth distributor 350 receive the streams of pacing results (e.g., first subset of pacing results 302 and second subset of pacing results 304) to a local in-memory cache. For example, each of first distributor 330, second distributor 340, and nth distributor 350 are implemented on computing devices with local cache memories (e.g., first distributor cache 335, second distributor cache 345, and nth distributor cache 355 respectively).

In some embodiments, each of first distributor 330, second distributor 340, and nth distributor 350 maintain pacing results 202 (e.g., aggregation of first subset of pacing results 302 and second subset of pacing results 304) in their respective memory cache and update their memory caches as new pacing results are streamed from content pacing layer 205. For example, first distributor 330 maintains first distributor cache 335 including the pacing results 202 (e.g., aggregation of first subset of pacing results 302 and second subset of pacing results 304) representing the most recently received pacing results.

As first host shard 310 and/or second host shard 320 of content pacing layer 205 update the pacing results (e.g., in response to updated pacing requirements and/or serving results), content pacing layer 205 streams the updated pacing results (e.g., updates to first subset of pacing results 302 and/or second subset of pacing results 304) to first distributor 330. In response to receiving updated pacing results, first distributor 330 updates the pacing results 202 stored in first distributor cache 335 with the incoming data (e.g., updated pacing results).

In such an example, because first distributor 330 updates first distributor cache 335 in response to a stream of updated pacing results rather than in response to discrete messages of pacing results, first distributor 330 does not need to wait to receive and process an entire message of pacing results, allowing first distributor 330 to update first distributor cache 335 faster than would otherwise be possible. Similarly, in embodiments where first distributor cache 335 is local to first distributor 330, first distributor 330 can update first distributor cache 335 very quickly in response to the stream of updated pacing results, further reducing the potential latency of the content serving system.

In some embodiments, one or more of first distributor 330, second distributor 340, and nth distributor 350 and accordingly their respective caches can be implemented on the same physical device. For example, first distributor 330, second distributor 340, and nth distributor 350 can be implemented in a cloud computing architecture where one or more of first distributor 330, second distributor 340, and/or nth distributor 350 can reside, temporarily or permanently, within the same physical hardware component.

In some embodiments, each of first distributor 330, second distributor 340, and nth distributor 350 send pacing results 202 to content serving layer 215. Pacing results 202 is the aggregation of first subset of pacing results 302 and second subset of pacing results 304 received from content pacing layer 205. Accordingly, the total pacing result output of content pacing distribution layer 150 (e.g., distributed pacing results 204 of FIG. 2) is pacing results 202 (the aggregation of first subset of pacing results 302 and second subset of pacing results 304) amplified by the number of distributors in content pacing distribution layer 150. As shown in FIG. 3, first distributor 330 sends pacing results 202 to serving hosts of content serving layer 215. For example, each of first distributor 330, second distributor 340, and nth distributor 350 send pacing results 202 to different subsets of serving hosts of content serving layer 215.

In some embodiments, content pacing distribution layer 150 streams pacing results 202 to content serving layer 215 by establishing itself as a host (e.g., RPC or restful service host) of pacing results 202 and streams pacing results 202 to content serving layer 215 in response to receiving a poll from content serving layer 215 for pacing results 202. For example, each of the content serving hosts of content serving layer 215 receive the stream of pacing results 202 in response to polling the host associated with content pacing distribution layer 150 (e.g., first distributor 330, second distributor 340, and nth distributor 350). In other embodiments, content pacing distribution layer 150 streams pacing results 202 to content serving layer 215 by actively pushing any new pacing results 202 to content serving layer 215. For example, content pacing distribution layer 150 (e.g., first distributor 330, second distributor 340, and nth distributor 350) pushes pacing results 202 to content serving layer 215 in response to aggregating the subsets of pacing results receiving from content pacing layer 205 (e.g., first subset pacing results 302 and second subset pacing results 304).

In some embodiments, content pacing distribution layer 150 streams pacing results 202 to content serving layer 215. For example, first distributor 330 announces, through a streaming protocol (such as remote procedure protocol (RPC)), that it has available data (e.g., pacing results 202). In such an example, serving hosts of content serving layer 215 can discover first distributor 330 through the streaming protocol as an available dispatcher for the data (e.g., pacing results 202). Accordingly, serving hosts of content serving layer 215 establish a streaming connection with first distributor 330 such that first distributor 330 streams pacing results 202 to content serving layer 215 as they are received/updated by content pacing distribution layer 150.

In some embodiments, content serving layer 215 determines a distributor of content pacing distribution layer 150 based on load balancing. For example, a serving host of content serving layer 215 selects the distributor of content pacing distribution layer 150 with the fewest coupled serving hosts and/or the least data traffic.

In some embodiments, due to the streaming connection between content pacing layer 205 and content pacing distribution layer 150 and the streaming connection between content pacing distribution layer 150 and content serving layer 215, distributors of content pacing distribution layer 150 can stream updated pacing results received from content pacing layer 205 to content serving layer 215 with low latency. For example, as mentioned above, content pacing distribution layer 150 can update the relevant distributor caches as updated pacing results are received from content pacing layer 205. Accordingly, content pacing distribution layer 150 can also stream the updated pacing results to serving hosts of content serving layer 215 as the updated pacing results are received by content pacing distribution layer 150.

Content serving layer 215 can determine content to serve to users of the content serving system. For example, a serving host of content serving layer 215 can determine served content 206 for a user system 110 of the content serving system using pacing results 202. In some embodiments, the serving host determines served content 206 using distribution parameters such as targeting criteria and serving criteria. Further details regarding content serving layer 215 are discussed with reference to FIG. 2.

FIG. 4 illustrates another example computing system 400 that includes a content pacing distribution layer 150 in accordance with some embodiments of the present disclosure. As shown in FIG. 4, computing system 400 also includes content pacing layer 205 and content serving layer 215. Content pacing distribution layer 150 includes first distributor first layer 410, second distributor first layer 420, first distributor second layer 430, second distributor second layer 440, and nth distributor second layer 450.

Each of first distributor first layer 410, second distributor first layer 420, first distributor second layer 430, second distributor second layer 440, and nth distributor second layer 450 includes a respective cache (e.g., first distributor first layer cache 415, second distributor first layer cache 425, first distributor second layer cache 435, second distributor second layer cache 445, and nth distributor second layer cache 455). Although five distributors are illustrated, content pacing distribution layer 150 can include any number of distributors. Additionally, although only two layers of distributors are illustrated, content pacing distribution layer 150 can include any number of layers of distributors with any number of distributors per layer.

As shown in FIG. 4, each of the first layer of distributors of content pacing distribution layer 150 receives pacing results from content pacing layer 205. For example, first distributor first layer 410 and second distributor first layer 420 each establish a streaming connection to pacing hosts of content pacing layer 205 as explained with reference to FIG. 3. Each of first distributor first layer 410 and second distributor first layer 420 aggregate the pacing results of the pacing hosts and generate pacing results 202.

In some embodiments, each of first distributor first layer 410 and second distributor first layer 420 receive pacing results 202 as a stream from content pacing layer 205. For example, each of first distributor first layer 410 and second distributor first layer 420 receive the streams of pacing results 202 to a local in-memory cache. For example, each of first distributor first layer 410 and second distributor first layer 420 are implemented on computing devices with local cache memories (e.g., first distributor first layer cache 415 and second distributor first layer cache 425 respectively).

In some embodiments, as explained with reference to FIG. 3, each of first distributor first layer 410 and second distributor first layer 420 maintain pacing results 202 (e.g., aggregation of pacing results from each pacing host of content pacing layer 205) in their respective memory cache (e.g., first distributor first layer cache 415 and second distributor first layer cache 425) and update their memory caches as new pacing results 202 are streamed from content pacing layer 205. For example, first distributor first layer 410 maintains first distributor first layer cache 415 including pacing results 202 representing the most recently received pacing results from content pacing layer 205.

In some embodiments, content pacing distribution layer 150 includes multiple layers of distributors. For example, as shown in FIG. 4, content pacing distribution layer 150 includes two layers of distributors. The first layer of distributors including first distributor first layer 410 and second distributor first layer 420 receive pacing results 202 from content pacing layer 205. The second layer of distributors including first distributor second layer 430, second distributor second layer 440, and nth distributor second layer 450 receive pacing results 202 from the first layer of distributors. For example, each of first distributor second layer 430, second distributor second layer 440, and nth distributor second layer 450 receive a stream of pacing results from one of the first layer distributors (e.g., first distributor first layer 410 or second distributor first layer 420).

In such embodiments, first distributor second layer 430, second distributor second layer 440, and nth distributor second layer 450 can use a streaming protocol to receive pacing results 202 from one of the first layer distributors. For example, first distributor first layer 410 announces, through a streaming protocol (such as remote procedure protocol (RPC)), that it has available data (e.g., pacing results 202). In such an example, second layer distributors such as first distributor second layer 430 and second distributor second layer 440 can discover first distributor first layer 410 through the streaming protocol as an available dispatcher for the data (e.g., pacing results 202). Accordingly, first distributor second layer 430 and second distributor second layer 440 establish a streaming connection with first distributor first layer 410 such that first distributor first layer 410 streams pacing results 202 to first distributor second layer 430 and second distributor second layer 440 as they are received/updated by first distributor first layer 410. In some embodiments, the second layer distributors determine a first layer distributor based on load balancing. For example, first distributor second layer 430 selects the distributor of the first layer of distributors with the fewest coupled second layer distributors and/or the least data traffic.

In some embodiments, content pacing distribution layer 150 generates a second distributor layer in response to the network traffic satisfying a threshold. For example, in response to the number of serving hosts with an established streaming connection for each of the distributors of content pacing distribution layer 150 satisfying a threshold, content pacing distribution layer 150 can assign a new layer of distributors and connect the existing layer of distributors with a first distributor in the first layer (e.g., first distributor first layer 410). In such an example, content pacing distribution layer 150 can assign new distributors as a second layer to a second distributor in the first layer (e.g., second distributor first layer 420). Accordingly, content pacing distribution layer 150 can prevent the workload for any single distributor from becoming too high and causing latency problems for the content serving system as a whole. For example, even as the number of serving hosts grows very large, the content pacing distribution layer 150 can simply assign more layers of distributors allowing the system to scale up without increasing the number of pacing hosts or suffering significant latency costs. In such an example, because streaming does not add a significant amount of latency (as an example, the streaming can take around a couple of milliseconds), even having many layers of distributors will not cause significant harm to the latency of the content serving system.

Each of first distributor second layer 430, second distributor second layer 440, and nth distributor second layer 450 can stream pacing results to serving hosts of content serving layer 215. For example, first distributor second layer 430 announces, through a streaming protocol (such as remote procedure protocol (RPC)), that it has available data (e.g., pacing results 202). In such an example, serving hosts of content serving layer 215 can discover first distributor second layer 430 through the streaming protocol as an available dispatcher for the data (e.g., pacing results 202). Accordingly, the serving hosts of content serving layer 215 establish a streaming connection with first distributor second layer 430 such that first distributor second layer 430 streams pacing results 202 to the serving hosts as they are received/updated by first distributor second layer 430 (e.g., from first distributor first layer 410).

In some embodiments, the serving hosts determine a distributor based on load balancing. For example, the serving hosts of content serving layer 215 select a distributor of the second layer of distributors with the fewest coupled serving hosts and/or the least data traffic.

In some embodiments, one or more of first distributor first layer 410, second distributor first layer 420, first distributor second layer 430, second distributor second layer 440, and nth distributor second layer 450 and their respective caches can be implemented on the same physical device and/or can otherwise be local to each serving host. For example, first distributor first layer 410, second distributor first layer 420, first distributor second layer 430, second distributor second layer 440, and nth distributor second layer 450 can be implemented in a cloud computing architecture where one or more of the distributors can reside, temporarily or permanently, within the same physical hardware component.

Content serving layer 215 can determine content to serve to users of the content serving system. For example, a serving host of content serving layer 215 can determine served content 206 for a user system 110 of the content serving system using pacing results 202. In some embodiments, the serving host determines served content 206 using distribution parameters such as targeting criteria and serving criteria. Further details regarding content serving layer 215 are discussed with reference to FIG. 2.

Figure 5:
FIG. 5 is a flow diagram of an example method to distribute pacing results for low latency content serving in accordance with some embodiments of the present disclosure.

FIG. 5 is a flow diagram of an example method 500 to distribute pacing results for low latency content serving in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by content pacing distribution layer 150 of FIG. 1. In other embodiments, the method 500 is performed by serving results aggregator 160 of FIG. 1. In still other embodiments, parts of the method 500 are performed by content pacing distribution layer 150 and parts of the method 500 are performed by serving results aggregator 160. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device establishes, by a distributor, a streaming connection with a pacing host to receive pacing results from the pacing host. For example, first distributor 330 establishes a streaming connection with first host shard 310 and second host shard 320 of content pacing layer 205. In some embodiments, the pacing host (e.g., first host shard 310 and second host shard 320) announces a streaming availability through a streaming protocol indicating that there is available data (e.g., first subset of pacing results 302 and second subset of pacing results 304) and one of the distributors of content pacing distribution layer 150 discovers the pacing host and establishes a streaming connection. Further details regarding establishing a streaming connection with a pacing host are described with reference to FIGS. 2-4.

At operation 510, the processing device receives, by the distributor, the pacing results from the pacing host. For example, first distributor 330 receives first subset of pacing results 302 from first host shard 310 and second subset of pacing results 304 from second host shard 320. In some embodiments, the pacing results are streamed from content pacing layer 205 in response to updating the pacing results.

For example, content pacing layer 205 streams updated pacing results to content pacing distribution layer 150 in response to generating updated pacing results based on serving results (e.g., serving results 208 and/or aggregated serving results 210). Further details regarding receiving the pacing results from a pacing host are described with reference to FIGS. 2-4.

At operation 515, the processing device stores, by the distributor, the pacing results in a local cache memory. For example, first distributor 330 stores first subset of pacing results 302 and second subset of pacing results 304 in first distributor cache 335. In some embodiments, the distributor streams the updated pacing results to connected serving hosts in response to storing the pacing results in a local cache memory. Further details regarding storing the pacing results in a local cache memory are described with reference to FIGS. 2-4.

At operation 520, the processing device streams, by the distributor, the pacing results from the local cache memory to serving hosts. For example, first distributor 330 streaming pacing results 202 from first distributor cache 335 to serving hosts of content serving layer 215. Content serving layer 215 determines served content 206 using the pacing results 202 streamed from first distributor 330. Further details regarding streaming the pacing results from local cache memory are described with reference to FIGS. 2-4.

Figure 6:
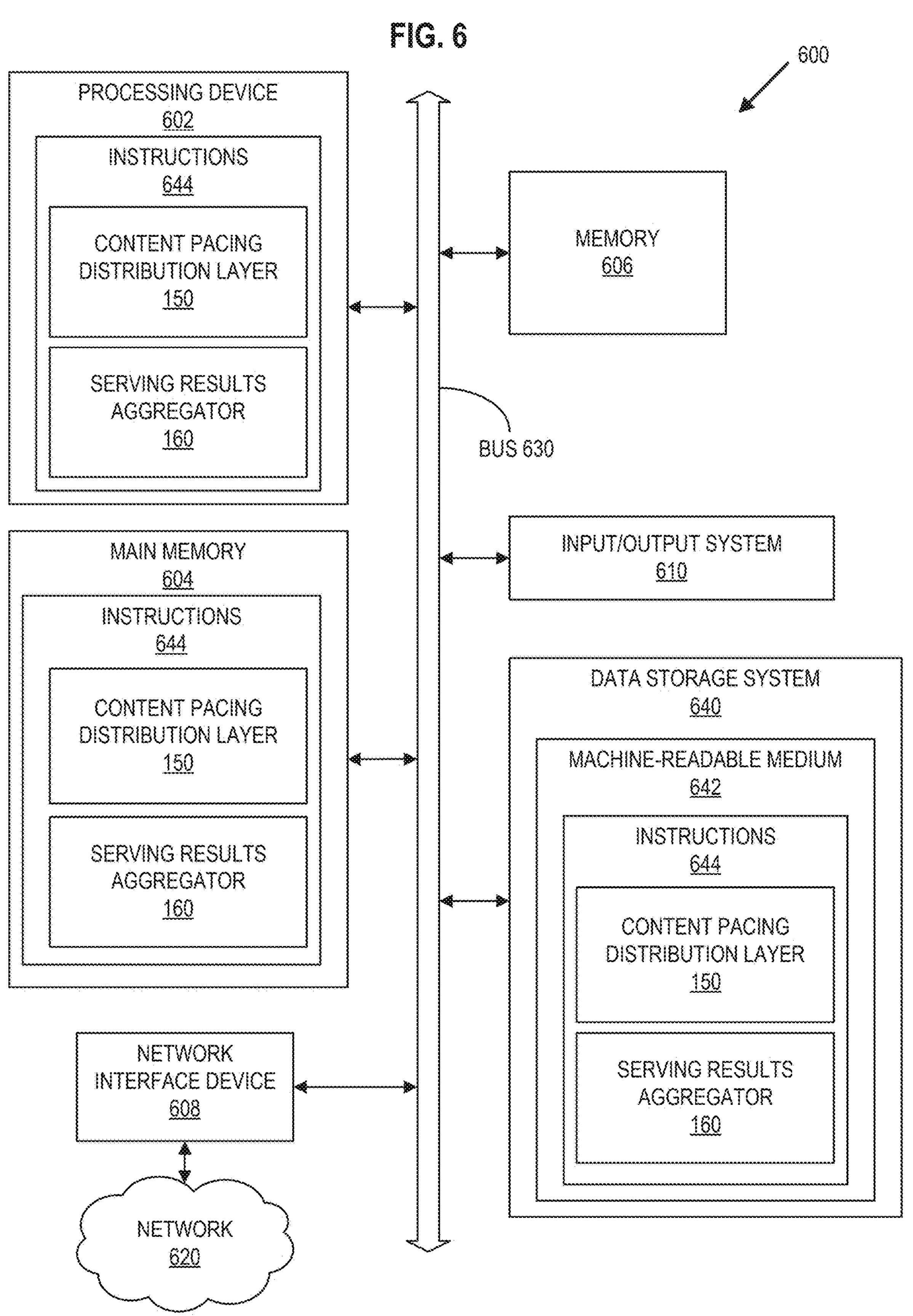
FIG. 6 is a block diagram of an example computer system in which embodiments of the present disclosure can operate.

FIG. 6 illustrates an example machine of a computer system 600 within which a set of instructions for causing the machine to perform any one or more of the methodologies discussed herein, can be executed. In some embodiments, the computer system 600 can correspond to a component of a networked computer system (e.g., computing system 100 of FIG. 1) that includes, is coupled to, or utilizes a machine to execute an operating system to perform operations corresponding to content pacing distribution layer 150 and/or serving results aggregator 160 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a memory 606 (e.g., flash memory, static random-access memory (SRAM), etc.), an input/output system 610, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 644 for performing the operations and steps discussed herein.

The computer system 600 can further include a network interface device 608 to communicate over the network 620. Network interface device 608 can provide a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation, network interface device 608 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 can include an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 can include a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 644 include instructions to implement functionality corresponding to a content pacing distribution layer (e.g., content pacing distribution layer 150 of FIG. 1). In another embodiment, the instructions 644 include instructions to implement functionality corresponding to a serving results aggregator (e.g., serving results aggregator 160 of FIG. 1). In yet another embodiment, the instructions 644 include instructions to implement functionality corresponding to both a content pacing distribution layer and a serving results aggregator (e.g., content pacing distribution layer 150 and serving results aggregator 160 of FIG. 1). While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Example 1. A method comprising: establishing, by a distributor of a plurality of distributors of a content serving system, a streaming connection with a pacing host of the content serving system; receiving, by the distributor, the pacing results from the pacing host through the streaming connection; storing, by the distributor, the pacing results in a local cache memory; and streaming, by the distributor, the pacing results from the local cache memory to a plurality of serving hosts, wherein the plurality of serving hosts determine content to deliver to a plurality of user devices of the content serving system using the pacing results.

Example 2. The method of example 1, wherein establishing the streaming connection with the pacing host comprises: establishing a streaming connection with each of a plurality of shards of the pacing host.

Example 3. The method of example 2, wherein receiving the pacing results from the pacing host comprises: receiving pacing results subsets from the plurality of shards; and aggregating the pacing results subsets into the pacing results.

Example 4. The method of example 3, wherein streaming, by the distributor, the pacing results from the local cache memory comprises: pushing the pacing results to the plurality of serving hosts in response to aggregating the pacing results subsets into the pacing results.

Example 5. The method of any of examples 1-4, wherein streaming, by the distributor, the pacing results to the plurality of serving hosts comprises: streaming, by a first layer distributor, the pacing results to a plurality of second layer distributors; and streaming, by a second layer distributor of the plurality of second layer distributors, the pacing results to the plurality of serving hosts.

Example 6. The method of any of examples 1-5, wherein streaming, by the distributor, the pacing results to the plurality of serving hosts comprises: announcing, by the distributor, a streaming availability to the plurality of serving hosts, wherein streaming the pacing results is in response to establishing a second streaming connection with the plurality of serving hosts.

Example 7. The method of example 6, wherein streaming, by the distributor, the pacing results to the plurality of serving hosts further comprises: amplifying the pacing results using a number of the plurality of serving hosts; and streaming the pacing results to each of the number of plurality of serving hosts.

Example 8. The method of any of examples 1-7, further comprising: establishing, by the distributor, a host for the pacing results stored in the local cache memory; and receiving a poll from a serving host of the plurality of serving hosts, wherein streaming, by the distributor, the pacing results from the local cache memory to the serving host is in response to receiving the poll from the serving host.

Example 9. The method of any of examples 1-8, wherein receiving, by the distributor, the pacing results from the pacing host comprises: sending a poll to the pacing host for the pacing results, wherein receiving, by the distributor, the pacing results from the pacing host is in response to sending the poll.

Example 10. A system comprising: at least one memory device; and a processing device, operatively coupled with the at least one memory device, to: establish, by a distributor of a plurality of distributors of a content serving system, a streaming connection with a pacing host of the content serving system; receive, by the distributor, the pacing results through the streaming connection; establish, by a serving host of a plurality of serving hosts, a second streaming connection with the distributor to receive pacing results from the distributor; stream, by the distributor, the pacing results to the serving host through the second streaming connection; receive, by the serving host, the pacing results through the second streaming connection; determine, by the serving host, content to deliver to a plurality of user devices of the content serving system using the pacing results; and cause, by the serving host, the determined content to be delivered to a user device of the plurality of user devices.

Example 11. The system of example 10, wherein establishing the streaming connection with the pacing host comprises establishing a streaming connection with each of a plurality of shards of the pacing host and wherein receiving the pacing results from the pacing host comprises: receiving pacing results subsets from the plurality of shards; and aggregating the pacing results subsets into the pacing results.

Example 12. The system of any of examples 10-11, wherein streaming, by the distributor, the pacing results to the serving host comprises: streaming, by a first layer distributor, the pacing results to a plurality of second layer distributors; and streaming, by a second layer distributor of the plurality of second layer distributors, the pacing results to the plurality of serving hosts.

Example 13. The system of any of examples 10-12, wherein streaming, by the distributor, the pacing results to the plurality of serving hosts comprises: announcing, by the distributor, a streaming availability to the plurality of serving hosts, wherein streaming the pacing results is in response to establishing a second streaming connection with the plurality of serving hosts.

Example 14. The system of example 13, wherein streaming, by the distributor, the pacing results to the plurality of serving hosts further comprises: amplifying the pacing results using a number of the plurality of serving hosts; and streaming the pacing results to each of the number of plurality of serving hosts.

Example 15. The system of any of examples 10-14, wherein the processing device is further to: receive, by a serving host of the plurality of serving hosts, serving results from a user device of the plurality of user devices, wherein the serving results comprise results of the delivery of the content; and send the serving results to the pacing host.

Example 16. The system of example 15, wherein the processing device is further to: aggregate the serving results with serving results from a second serving host of the plurality of serving hosts to generate aggregated serving results, wherein sending the serving results to the pacing host comprises sending the aggregated serving results to the pacing host.

Example 17. The system of example 16, wherein the processing device is further to: receive, by the pacing host, the serving results from the serving host; generate updated pacing results using the serving results; and stream the updated pacing results to the distributor in response to generating the updated pacing results.

Example 18. The system of any of examples 10-17, wherein the processing device is further to: establish, by the distributor, a host for the pacing results; and send, by the serving host, a poll to the distributor, wherein receiving, by the serving host, the pacing results through the second streaming connection is in response to sending the poll.

Example 19. A non-transitory computer-readable storage medium comprising instructions that, when executed by a processing device, cause the processing device to: establish, by a first layer distributor of a plurality of first layer distributors of a content serving system, a streaming connection with a pacing host of the content serving system; receive, by the first layer distributor, the pacing results through the streaming connection; establish, by a second layer distributor of a plurality of second layer distributors, a second streaming connection with the first layer distributor to receive pacing results from the first layer distributor; stream, by the first layer distributor, the pacing results to the second layer distributor; establish, by a serving host of a plurality of serving hosts, a third streaming connection with the second layer distributor to receive pacing results from the second layer distributor; receive, by the serving host, the pacing results through the third streaming connection; determine, by the serving host, content to deliver to a plurality of user devices of the content serving system using the pacing results; and cause, by the serving host, the determined content to be delivered to a user device of the plurality of user devices.

Example 20. The non-transitory computer-readable storage medium of example 19, wherein establishing the streaming connection with the pacing host comprises establishing a streaming connection with each of a plurality of shards of the pacing host and wherein receiving the pacing results from the pacing host comprises: receiving pacing results subsets from the plurality of shards; and aggregating the pacing results subsets into the pacing results.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may choose to share personal data with different platforms to provide services that are more tailored to the users. In instances where the users choose not to share personal data with the platforms, the choices made by the users will not have any impact on their ability to use the services that they had access to prior to making their choice. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

establishing, by a distributor of a plurality of distributors of a content serving system, a first streaming connection with a pacing host of the content serving system;

receiving, by the distributor, the pacing results from the pacing host through the first streaming connection;

storing, by the distributor, the pacing results in a local cache memory; and streaming, by the distributor, the pacing results from the local cache memory to a plurality of serving hosts by:

streaming, by a first layer distributor of the distributor, the pacing results to a plurality of second layer distributors of the distributor; and streaming, by a second layer distributor of the plurality of second layer distributors, the pacing results to the plurality of serving hosts, wherein the plurality of serving hosts determine content to deliver to a plurality of user devices of the content serving system using the pacing results.

2. The method of claim 1, wherein establishing the first streaming connection with the pacing host comprises:

establishing a streaming connection with each of a plurality of shards of the pacing host.

3. The method of claim 2, wherein receiving the pacing results from the pacing host comprises:

receiving pacing results subsets from the plurality of shards; and aggregating the pacing results subsets into the pacing results.

4. The method of claim 3, wherein streaming, by the distributor, the pacing results from the local cache memory comprises:

pushing the pacing results to the plurality of serving hosts in response to aggregating the pacing results subsets into the pacing results.

5. The method of claim 1, wherein streaming, by the distributor, the pacing results to the plurality of serving hosts comprises:

announcing, by the distributor, a streaming availability to the plurality of serving hosts, wherein streaming the pacing results is in response to establishing second streaming connections with the plurality of serving hosts.

6. The method of claim 1, wherein streaming, by the distributor, the pacing results to the plurality of serving hosts further comprises:

amplifying the pacing results using the number of the plurality of serving hosts; and streaming the pacing results to each of the plurality of serving hosts.

7. The method of claim 1, further comprising:

establishing the distributor as a host for the pacing results stored in the local cache memory; and receiving, by the distributor, a poll from a serving host of the plurality of serving hosts, wherein streaming, by the distributor, the pacing results from the local cache memory to the serving host is in response to receiving the poll from the serving host.

8. The method of claim 1, wherein receiving, by the distributor, the pacing results from the pacing host comprises:

sending a poll to the pacing host for the pacing results, wherein receiving, by the distributor, the pacing results from the pacing host is in response to sending the poll.

9. A system comprising:

at least one memory device; and a processor, operatively coupled with the at least one memory device, to:

establish, by a distributor of a plurality of distributors of a content serving system, a first streaming connection with a pacing host of the content serving system;

receive, by the distributor, the pacing results through the first streaming connection;

establish, by a plurality of serving host, second streaming connections with the distributor to receive pacing results from the distributor;

stream, by the distributor, the pacing results to the plurality of serving hosts through the second streaming connections by:

streaming, by a first layer distributor of the distributor, the pacing results to a plurality of second layer distributors of the distributor; and streaming, by a second layer distributor of the plurality of second layer distributors, the pacing results to the plurality of serving hosts, receive, by the plurality of serving hosts, the pacing results through the second streaming connections;

determine, by a serving host of the plurality of serving hosts, content to deliver to a plurality of user devices of the content serving system using the pacing results; and cause, by the serving host, the determined content to be delivered to a user device of the plurality of user devices.

10. The system of claim 9, wherein establishing the first streaming connection with the pacing host comprises establishing a streaming connection with each of a plurality of shards of the pacing host and wherein receiving the pacing results from the pacing host comprises:

receiving pacing results subsets from the plurality of shards; and aggregating the pacing results subsets into the pacing results.

11. The system of claim 9, wherein streaming, by the distributor, the pacing results to the plurality of serving hosts comprises:

announcing, by the distributor, a streaming availability to the plurality of serving hosts, wherein streaming the pacing results is in response to establishing the second streaming connections with the plurality of serving hosts.

12. The system of claim 11, wherein streaming, by the distributor, the pacing results to the plurality of serving hosts further comprises:

amplifying the pacing results using the number of the plurality of serving hosts; and streaming the pacing results to each of the plurality of serving hosts.

13. The system of claim 9, wherein the processor is further to:

receive, by a serving host of the plurality of serving hosts, serving results from a user device of the plurality of user devices, wherein the serving results comprise results of the delivery of the content; and send the serving results to the pacing host.

14. The system of claim 13, wherein the processor is further to:

aggregate the serving results with serving results from a second serving host of the plurality of serving hosts to generate aggregated serving results, wherein sending the serving results to the pacing host comprises sending the aggregated serving results to the pacing host.

15. The system of claim 14, wherein the processor is further to:

receive, by the pacing host, the serving results from the serving host;

generate updated pacing results using the serving results; and stream the updated pacing results to the distributor in response to generating the updated pacing results.

16. The system of claim 9, wherein the processor is further to:

establish the distributor as a host for the pacing results; and send, by the serving host, a poll to the distributor, wherein receiving, by the serving host, the pacing results through the second streaming connections is in response to sending the poll.

17. A non-transitory computer-readable storage medium comprising instructions that, when executed by a processor, cause the processor to:

establish, by a first layer distributor of a plurality of first layer distributors of a content serving system, a first streaming connection with a pacing host of the content serving system;

receive, by the first layer distributor, the pacing results through the first streaming connection;

establish, by a second layer distributor of a plurality of second layer distributors, a second streaming connection with the first layer distributor to receive pacing results from the first layer distributor;

stream, by the first layer distributor, the pacing results to the second layer distributor;

establish, by a plurality of serving hosts, third streaming connections with the second layer distributor to receive pacing results from the second layer distributor;

receive, by the plurality of serving hosts, the pacing results through the third streaming connections;

determine, by a serving host of the plurality of serving hosts, content to deliver to a plurality of user devices of the content serving system using the pacing results; and cause, by the serving host of the plurality of serving hosts, the determined content to be delivered to a user device of the plurality of user devices.

18. The non-transitory computer-readable storage medium of claim 17, wherein establishing the first streaming connection with the pacing host comprises establishing a streaming connection with each of a plurality of shards of the pacing host and wherein receiving the pacing results from the pacing host comprises:

receiving pacing results subsets from the plurality of shards; and aggregating the pacing results subsets into the pacing results.

* * * * *